(12) United States Patent
Beach et al.

(10) Patent No.: US 9,371,135 B2
(45) Date of Patent: Jun. 21, 2016

(54) TOILET CONCEPTS

(71) Applicant: MAG AEROSPACE INDUSTRIES, LLC, Carson, CA (US)

(72) Inventors: David A. Beach, Seal Beach, CA (US); Kevin Huang, Los Angeles, CA (US); Christoph Goeschel, Seattle, WA (US); Timothy Birbeck, Torrance, CA (US); Howard C. B. Kuhns, Long Beach, CA (US); Nguyen Tram, Chino Hills, CA (US); Gil Fitzpatrick Lenhard, Torrance, CA (US); Angela M. Hsueh, Diamond Bar, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 14 days.

(21) Appl. No.: 14/085,976

(22) Filed: Nov. 21, 2013

(65) Prior Publication Data

US 2014/0137319 A1 May 22, 2014

Related U.S. Application Data

(63) Continuation of application No. 13/804,539, filed on Mar. 14, 2013.

(60) Provisional application No. 61/729,225, filed on Nov. 21, 2012.

(51) Int. Cl.
| | |
|---|---|
| *B64D 11/02* | (2006.01) |
| *E03D 5/00* | (2006.01) |
| *E03F 1/00* | (2006.01) |
| *E03D 9/05* | (2006.01) |

(52) U.S. Cl.
CPC ............... *B64D 11/02* (2013.01); *E03D 5/003* (2013.01); *E03D 9/05* (2013.01); *E03F 1/006* (2013.01); *Y02T 50/46* (2013.01)

(58) Field of Classification Search
USPC .................................................. 4/431, 252.1
See application file for complete search history.

(56) References Cited

U.S. PATENT DOCUMENTS

| | | | |
|---|---|---|---|
| 4,358,864 A | 11/1982 | Medrano | |
| 4,376,314 A * | 3/1983 | Iwans | E03F 1/006 4/420 |

(Continued)

FOREIGN PATENT DOCUMENTS

| | | |
|---|---|---|
| DE | 10257133 A1 | 9/2004 |
| DE | 102008018270 A1 | 10/2009 |

(Continued)

OTHER PUBLICATIONS

PCT/US2013/071150, Invitation to Pay Additional Fees and Partial Search Report dated Jun. 3, 2014, 5 pages.

(Continued)

*Primary Examiner* — Lauren Crane

(74) *Attorney, Agent, or Firm* — Kilpatrick Townsend & Stockton LLP; Dean W. Russell; Kristin M. Crall

(57) ABSTRACT

Embodiments described herein relate to quick release toilet concepts, which can be useful particularly on-board aircraft and other passenger transport vehicles. Further embodiments relate to improved shroud components for toilets that help reduce splash. Further embodiments also relate to flushing systems for use with vacuum toilets.

3 Claims, 8 Drawing Sheets

(56) References Cited

U.S. PATENT DOCUMENTS

| | | | |
|---|---|---|---|
| 4,561,132 A | 12/1985 | Lew et al. | |
| 4,928,326 A | 5/1990 | Olin et al. | |
| 4,955,091 A | 9/1990 | Grills et al. | |
| 5,035,011 A | 7/1991 | Rozenblatt et al. | |
| 5,133,853 A | 7/1992 | Mattsson et al. | |
| 5,201,082 A | 4/1993 | Rockwell | |
| 5,251,346 A | 10/1993 | Donati | |
| 5,317,766 A | 6/1994 | McDonald et al. | |
| 5,406,657 A | 4/1995 | Donati | |
| 5,421,040 A | 6/1995 | Oldfelt | |
| 5,813,047 A | 9/1998 | Teichroeb | |
| 5,924,967 A * | 7/1999 | Furlani et al. | 492/54 |
| 6,226,807 B1 * | 5/2001 | Rozenblatt et al. | 4/431 |
| 6,325,356 B1 | 12/2001 | Rozenblatt | |
| 6,353,942 B1 | 3/2002 | Pondelick et al. | |
| 6,536,054 B2 | 3/2003 | Anderson et al. | |
| 6,536,055 B2 | 3/2003 | Pondelick et al. | |
| 7,118,677 B2 | 10/2006 | Hoffjann et al. | |
| 7,533,426 B2 | 5/2009 | Pondelick | |
| 7,947,164 B2 | 5/2011 | Hoffjann et al. | |
| 2001/0034902 A1 | 11/2001 | Tyler | |
| 2006/0288472 A1 | 12/2006 | Pondelick | |
| 2008/0185477 A1 | 8/2008 | Seibt | |
| 2009/0043380 A1 * | 2/2009 | Blaha et al. | 623/1.46 |
| 2009/0074518 A1 | 3/2009 | Mueller et al. | |
| 2010/0251472 A1 | 10/2010 | Culwell | |
| 2012/0051977 A1 | 3/2012 | Boodaghians et al. | |
| 2013/0036539 A1 | 2/2013 | Zahir et al. | |
| 2013/0146783 A1 | 6/2013 | Boodaghians et al. | |
| 2013/0305444 A1 | 11/2013 | Boodaghians et al. | |
| 2014/0020167 A1 | 1/2014 | Rieger et al. | |

FOREIGN PATENT DOCUMENTS

| | | |
|---|---|---|
| EP | 0363012 | 4/1990 |
| EP | 1698735 | 9/2006 |
| EP | 2690015 A1 | 1/2014 |
| GB | 2248858 A | 4/1992 |
| JP | 2001-049181 A | 2/2001 |
| WO | 03004785 | 1/2003 |
| WO | 2013172953 | 11/2013 |
| WO | 2014081912 | 5/2014 |

OTHER PUBLICATIONS

PCT/US2013/071150, Search Report and Written Opinion dated Aug. 14, 2014, 19 pages.
International Search Report and Written Opinion dated Sep. 16, 2013 in Application No. PCT/US2013/031224.
U.S. Appl. No. 61/714,912, filed Oct. 17, 2012.
International Patent Application No. PCT/US2013/071150, International Preliminary Report on Patentability dated Jun. 4, 2015.
U.S. Appl. No. 13/804,539, Office Action dated Mar. 26, 2015.
U.S. Appl. No. 13/804,539, Office Action dated Oct. 6, 2015.
U.S. Appl. No. 13/804,539, Office Action dated Feb. 1, 2016.
China Patent Application No. 201380025534.3, Office Action dated Oct. 10, 2015.
Dual Flush Toilet Is a Sink and Greywater System in One http://inhabitat.com/dual-flush-toilet-is-a-sink-and-greywater-system-in-one/ three pages Mar. 10, 2013.

* cited by examiner

FIG. 6A
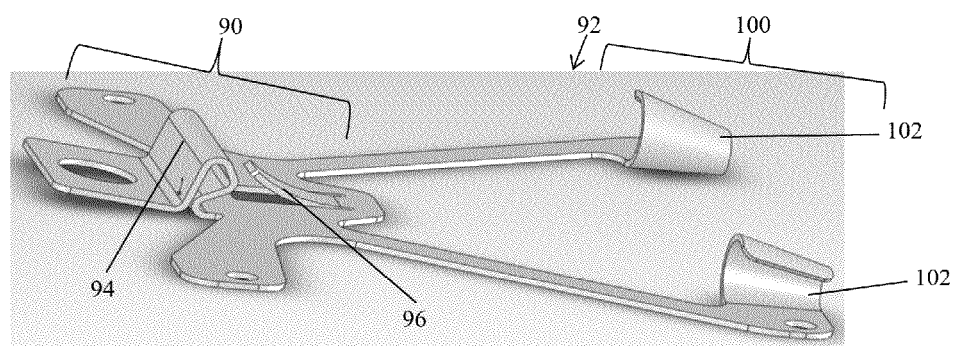
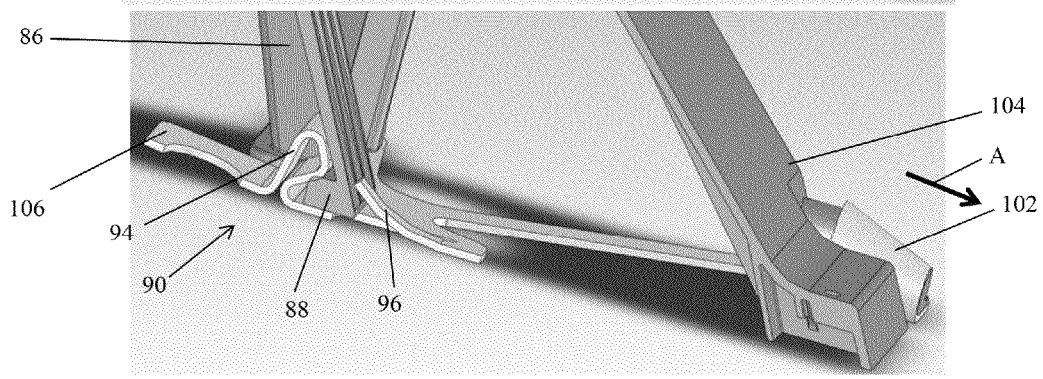
FIG. 6B

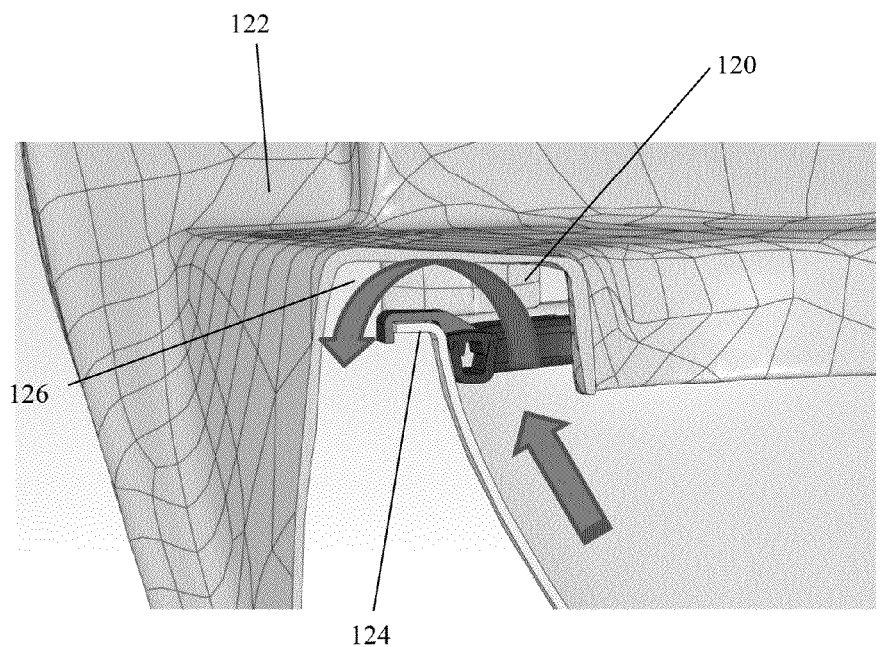
FIG. 7
Prior Art
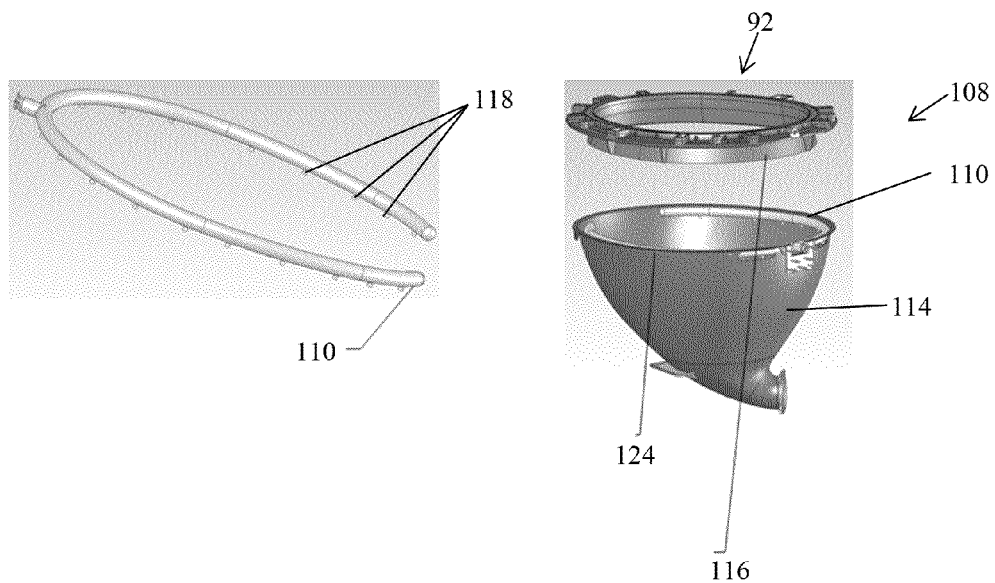
FIG. 8
FIG. 9

TOILET CONCEPTS

CROSS REFERENCE TO RELATED APPLICATIONS

This application claims the benefit of U.S. Provisional Application Ser. No. 61/729,225, filed Nov. 21, 2012 titled "Toilet Concepts," the entire contents of which are hereby incorporated by reference. This application is also a continuation of U.S. Ser. No. 13/804,539 filed Mar. 14, 2013 titled "Two Stage Flush and Grey Water Flush Systems and Devices," the entire contents of which are hereby incorporated by reference.

FIELD OF THE INVENTION

Embodiments described herein relate to quick release toilet concepts, which can be particularly useful on-board aircraft and other passenger transport vehicles. Further embodiments relate to improved shroud components for toilets that help reduce odor. Further embodiments also relate to improved flushing systems for use with vacuum toilets.

BACKGROUND

Many types of passenger transport vehicles (such as aircraft, ships, buses, trains, and any other passenger transport vehicles) use vacuum toilets. These toilets generally experience a very high service frequency, as there are typically only a few toilets provided that are intended to service hundreds of passengers. Thus, improvements for removing and replacing the toilets, as well as their components, are provided herein.

These toilets are also used in a small enclosed space, such as an aircraft lavatory. Although venting and odor-reduction features are provided in lavatories, cleanliness and waste splash may still present issues, particularly around the toilet shroud.

Additionally, the use of vacuum toilets can also be noisy. The toilets are used to flush septic waste and deliver it to a septic waste holding tank on-board the vehicle. Improvements for this delivery are also provided herein.

BRIEF SUMMARY

Certain embodiments described herein provide a quick release feature for toilets and their related components. These quick release features find particular use in connection with vacuum toilets, which may need to have various components of the toilet replaced more often than typical residential or other commercial toilets. In addition, maintenance on-board aircraft and other vehicles can be particularly expensive in view of the downtime and lost revenue due to reduced travel time of the vehicle. Accordingly, increased flexibility for replacing worn or damaged parts is a critical improvement to vehicle toilet systems. Nonetheless, although the embodiments described herein find particular use on-board passenger transport vehicles and the embodiments may be described with specific reference to aircraft toilet systems, it should be understood that the features may be translated to other industries if appropriate.

Further embodiments provide improvements to the bowl to shroud interface. For example, vacuum toilets work by injecting air and water into the bowl via a rinse ring. Because of the vacuum provided, regulations require that an airflow space be provided between the toilet bowl and the shroud. This airflow space is intended to protect against potential suction creation between the vacuum system via a vacuum toilet flush and a passenger seated on the toilet without any air gaps. The air space provides a pathway for air to enter the toilet bowl to release any suction lock that may otherwise be created. However, this air space also creates a space for liquid and/or solid waste to become lodged, which can create bacterial growth and unpleasant odors. Thus, improvements for toilet/rinse ring/shroud interfaces are provided herein.

Further embodiments seek to reduce noise levels by providing a flushing cycle that demands lesser vacuum levels for at least a portion of the flush cycle. There is provided a two-stage flush that uses a single transient tank positioned between nearby lavatories, such that two lavatories can be serviced by a single tank. The single transient tank may be positioned in fluid communication between one or more toilet bowls and the main aircraft waste tank. This reduces the noise level associated with the flush process because a lesser vacuum is demanded for the first stage of the flush.

BRIEF DESCRIPTION OF THE DRAWINGS

FIGS. 6A and 6B show a further embodiment of a toilet quick release feature.

FIG. 7 shows a side view of a prior art toilet to shroud interface, with blocks that separate the toilet body from the shroud.

FIG. 8 shows a side perspective view of a toilet rinse ring.

FIG. 9 shows a side perspective exploded view of a toilet having a rinse ring and an air diverter.

DETAILED DESCRIPTION

Embodiments of the present invention provide systems and devices for quickly disconnecting toilets and certain related toilet components. For example, aircraft toilets and their various components may need to be easily disconnected from the lavatory space for maintenance or replacement. Rather than requiring multiple bolts or screws that must be individually removed, the present disclosure seeks to provide improved ways for installing toilets and various components with quick release functionality.

In one aspect, the toilets are provided with a modular design of components and line-replaceable units that are easily removable with an aim to reduce replacement time and loose hardware that may be lost during line replacement. Quick release of the toilets and/or the related component equipment may be achieved in a reliable and robust manner.

Figure 1:
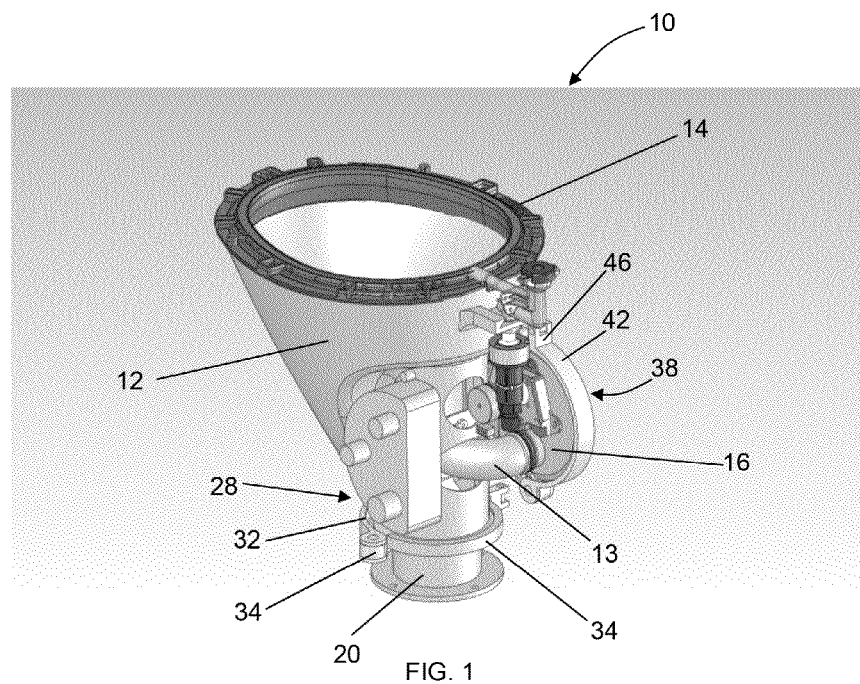
FIG. 1 shows a rear perspective view of one embodiment of a quick release feature connecting a toilet body to an aircraft lavatory floor.
Figure 2:
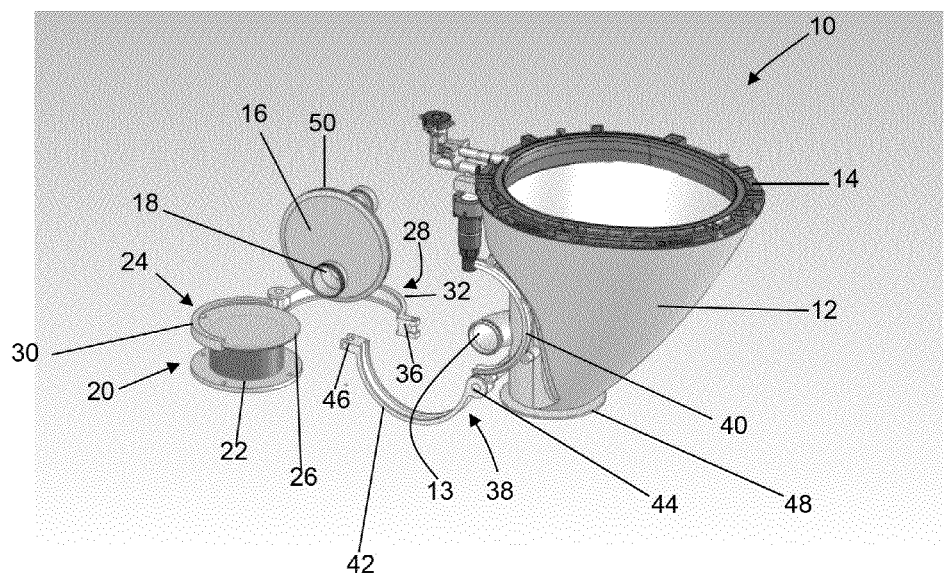
FIG. 2 shows a side perspective blown apart view of the quick release feature of FIG. 1.

In the embodiment shown in FIGS. 1 and 2, the toilet system 10 can include a toilet body 12, an air diverter 14, and a vacuum interface 16 with a flush valve 18. The flush valve 18 opens and closes to direct and stop vacuum delivery to the toilet system 10 during a flush sequence. There are various reasons why the toilet body 12 may need to be replaced. For example, the toilet bowl and/or the toilet body 12 may be cracked or worn, the integral vacuum pipe 13 maybe damaged, one or more of the components positioned on the toilet body 12 may be damaged, or a newer model may simply need to be installed.

There are also various reasons why the vacuum interface 16 may need to be replaced separately from the toilet body 12. For example, the seals of the flush valve 18 may become worn, the flush valve 18 may need to be replaced with a newer model, or any other reason. In this instance, rather than removing the compete toilet system 10 in order to replace one of the components, embodiments provide a way that just the toilet bowl body 12 and/or just the vacuum interface 16 can be removed and replaced.

An aircraft lavatory generally has a structural interface 20. This structural interface 20 is secured to the aircraft lavatory floor via a mounting plate 22. The structural interface 20 also has a clamp cooperating surface 24. This surface is shown as an upper plate 26, but it should be understood that any surface that can cooperate with a clamp may be provided and is considered within the scope of this disclosure.

As shown, in FIG. 2, a first clamp feature 28 secures toilet body 12 to the structural interface 20. A first arm 30 of the clamp feature 28 is configured to cooperate with a first half of the upper plate 26. A second arm 32 of the clamp feature 28 is configured to cooperate with a second half of the upper plate 26. The first arm 30 and second arm 32 are hingedly secured via a hinge 34. In use, the ends of the arms 30, 32 may be positioned around the upper plate 26 of the structural interface 20 and secured to one another via a locking feature 36.

The toilet body 12 also has a clamp feature 38, similar to the first clamp feature 28. The toilet body clamp feature 38 has a first arm 40 secured to the toilet body 12 or otherwise associated therewith. A second arm 42 is hindegely secured to the first arm 40 via hinge 44. In use, the ends of the arms 40, 42 may be positioned around the vacuum interface 16 and secured to one another via a locking feature 46.

In the embodiment shown in FIG. 1, the toilet body 12 is secured to the structural interface 20 via first clamp 28 which is clamped around toilet body base 48 and secured to the clamp cooperating surface 24. This allows a removable securement of both the toilet body 12 to the structural interface 20. For example, the toilet body base 48 may be positioned on top of the upper plate 26, and the clamp feature 28 may be secured around both the plate 26 and the base 48.

The vacuum pipe 13 of the toilet body 12 can be aligned with the opening of the flush valve 18. This can allow fluid communication between the flush valve and the toilet body 12. To secure the vacuum interface 16 and the toilet body 12 in place with respect to one another, the toilet body clamp 38 can be secured to the vacuum interface 16. The arms 40, 42 of the toilet body clamp feature 38 can be positioned around an external circumference 50 of the vacuum interface 16. To secure the vacuum interface 16 and the toilet body 12 in place with respect to one another, the clamp arms 40, 42 are secured via locking feature 46. The toilet body 12 and the vacuum interface 16 are now secured to one another to ensure a strong connection of the components, even under strong vacuum pressure.

The clamp features 28, 38 allow for easy removal and replacement and securement of the toilet body 12 and/or the vacuum interface 16 to and from the aircraft floor via the structural interface 20. This helps reduce the possibility of loose hardware that may be lost during line replacement. With the release of the clamp features 28, 38 and quick disconnect couplings to the water hose and waste tube, the toilet body 12 is easily installed and removed from the lavatory. It is also possible to remove and replace the vacuum interface flush valve 18 without having to remove the entire toilet body 12. This disclosure allows the flush valve 18 to be separately removed and replaced, without disassembling entire toilet to remove and replace the flush valve. It should be understood that the clamp features described may be used to secure other items to the toilet system.

Figure 3A:
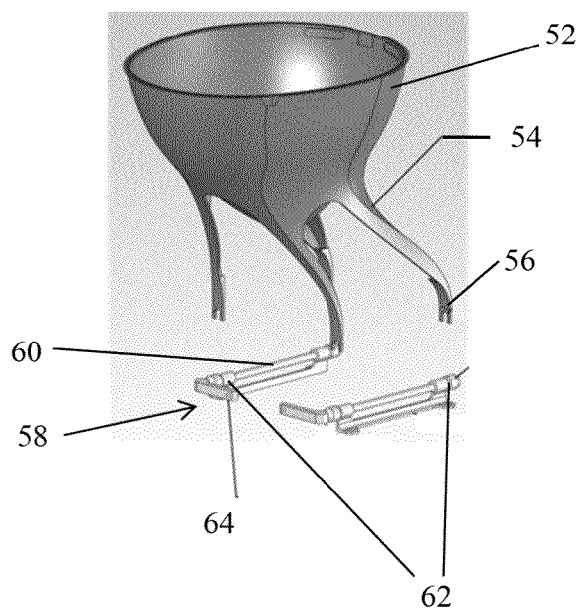
FIGS. 3A and 3B show an alternate embodiment of a toilet quick release feature.
Figure 3B:
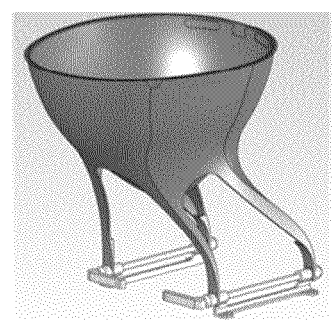

An alternate quick release design is shown in FIGS. 3A and 3B. In these figures, the toilet body 52 has legs 54 with open slots 56. These open slots 56 may be designed similarly to open forks on bicycles for wheel replacement. A track system 58 may be mounted to the lavatory floor. The track system 58 may include a track body 60 with connecting portions 62 that receive and lock the open slots 56 into place. The track system 58 may also have one or more locking features 64 to prevent release of the open slots 56 from the connecting portions 62. In use, the legs 54 of the toilet body 52 may be snapped into place and locked with respect to the track system 58, as shown in FIG. 3B.

Figure 4:
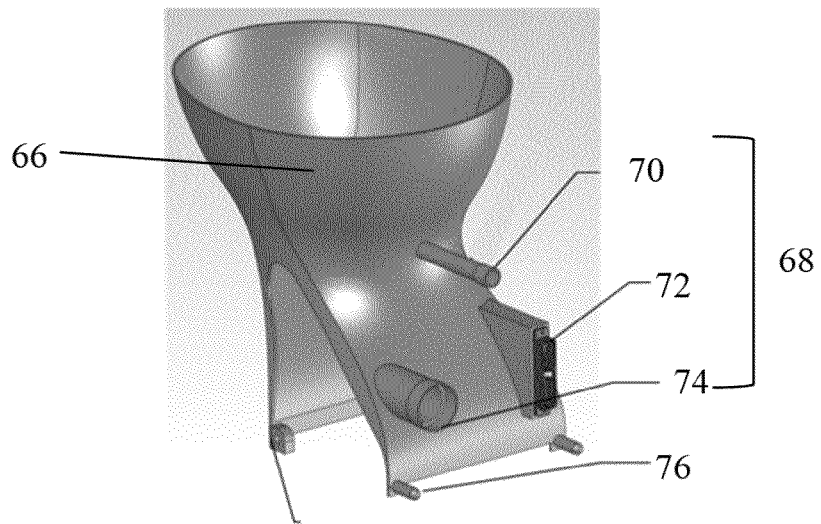
FIG. 4 shows an alternate embodiment of a toilet quick release feature.

FIG. 4 shows an alternate quick release design. This design provides a toilet body 66 with one or more connection interfaces 68 on a rear surface of the toilet body 66. These connection interfaces 68 are designed to connect with corresponding interfaces on the lavatory wall. The toilet body 66 can be pushed into the wall, and the connections can be made. For example, FIG. 4 shows a water connection 70, a power connection 72, and a waste system connection 74. Corresponding connections may be provided on the aircraft structure or wall. When the toilet body 66 is pushed into place, one or more pins 76 may fit into receptacles on the lavatory side to secure the toilet body 66 into place.

Figure 5:
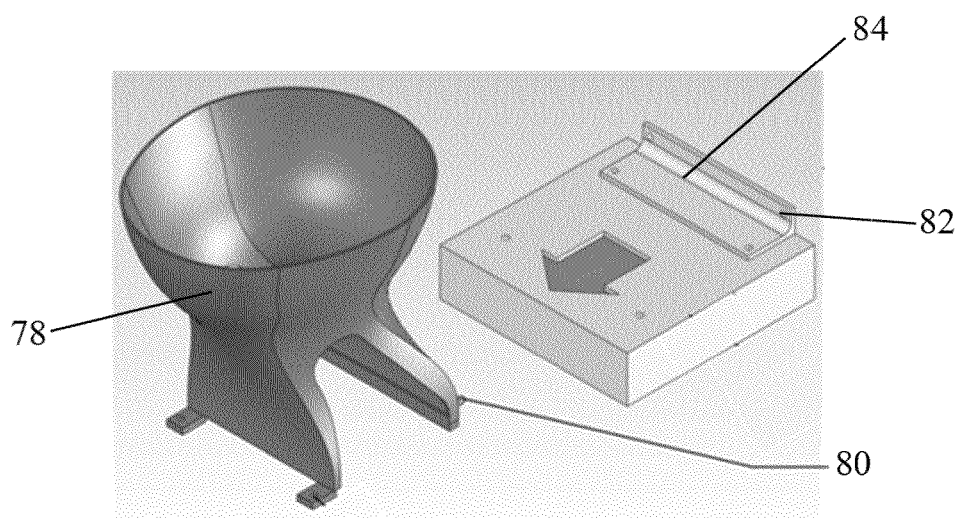
FIG. 5 shows a further embodiment of a toilet quick release feature.

FIG. 5 shows an alternate quick release design. This design provides a toilet body 78 with one or more rear pins 80 that can cooperate with one or more rear pin holes 82 on a pin hole bracket 84. The rear pins 80 may slide into the rear pins holes 82 and be secured in any appropriate manner, such as via a bolt connection or any other appropriate securement feature. If desired, the pins 80 may be threaded. It is also possible for the pins to be provided on the bracket and for pin holes to be provided on the toilet body.

FIGS. 6A and 6B show an alternate quick release design. This design provides a toilet leg 86 with one or more connection feet 88. The one or more connection feet 88 cooperate with a receiving binding 90 on a bracket 92 that may be secured to an aircraft lavatory floor. FIG. 6A shows a side perspective view of a bracket 92 with a receiving binding 90. FIG. 6B shows a connection foot 88 in place in the receiving binding 90. Referring now more specifically to FIG. 6A, the receiving binding 90 has a back support 94 and a front support 96. The back support 94 and front support 96 are sufficiently malleable such that they can flex to receive the connection foot 88 in use, as shown in FIG. 6B. The bracket 92 also has a second portion 100 with one or more angled receivers 102 that receive a corresponding foot 104.

In use, the corresponding foot 104 is inserted into the angled receiver 102 such that it slides in at a forward angle, shown by arrow A. The connection foot 88 is then snapped into place between the back support 94 and the front support 96. If the toilet body is to be removed, pressure may be applied to a flange 106 positioned adjacent the back support 94. This pressure forces the back support 94 in a direction to lessen the pressure applied to the connection foot 88, such that the connection foot 88 can be removed from the bracket 92.

Another feature that may be provided in order to improve and ease interchangeability of toilet bodies is an improved toilet to shroud interface. Traditionally, integration of the toilet-shroud interface has created gaps that are not easily cleanable. These gaps are necessary for safety reasons. For example, as shown in FIG. 7, which illustrates a prior art toilet to shroud interface, blocks 120 have been provided to space the shroud 122 off of the toilet bowl rim 124 in order to create an air gap 126. This air gap 126 is necessary because if a user makes a complete seal with the toilet rim and there is no space for air flow during a flush, there is a chance of internal damage to the user due to the strength of vacuum created during the flush. However, often this air gap 126 between the toilet rim 124 and the shroud 122 can become a path where waste can splash, collect and drip down the side and the back of the shroud 122, as shown by the arrows in FIG. 7. Cleaning of the shroud 122 is difficult at this location, without tearing out the shroud, which is generally undesirable due to the maintenance, down-time, and the related costs that would be required. However, trapped odors can create an unpleasant experience for passengers. Accordingly, an improved toilet to shroud interface is provided. One example is shown in FIGS. 8-11.

The concept provides a sealed interface between the toilet and the shroud, but that still allows the required air gap. In one embodiment, a toilet 108 has a rinse ring 110. The rinse ring 110 can be sealed adjacent the inner surface of the toilet rim 124. The rinse ring 110 may be sealed directly against the toilet bowl 114 or it may be integrated into the toilet bowl 114. In an alternate embodiment, the rinse ring 110 may be integrated with the air diverter element 116, described below. The rinse ring 110 is provided to inject air and water into the toilet bowl 114 during a flush via one or more injectors 118, as shown in FIG. 8. Rinse ring 110 may be manufactured by rotational molding out of ABS or other plastic. Carbon may be wrapped around the ABS part into order to reduce part count, hardware count, and to create a more smooth design for better cleaning As shown in FIG. 9, the rinse ring 110 may be secured, sealed, or otherwise integrated into the toilet bowl 114. An air diverter element 116 is then positioned over the toilet bowl 114. In another embodiment, the rinse ring 110 may be secured, sealed or otherwise integrated into the air diverter element 116. In either embodiment, the rinse ring 110 generally fits against the toilet bowl at or near the toilet rim 124.

Figure 10:
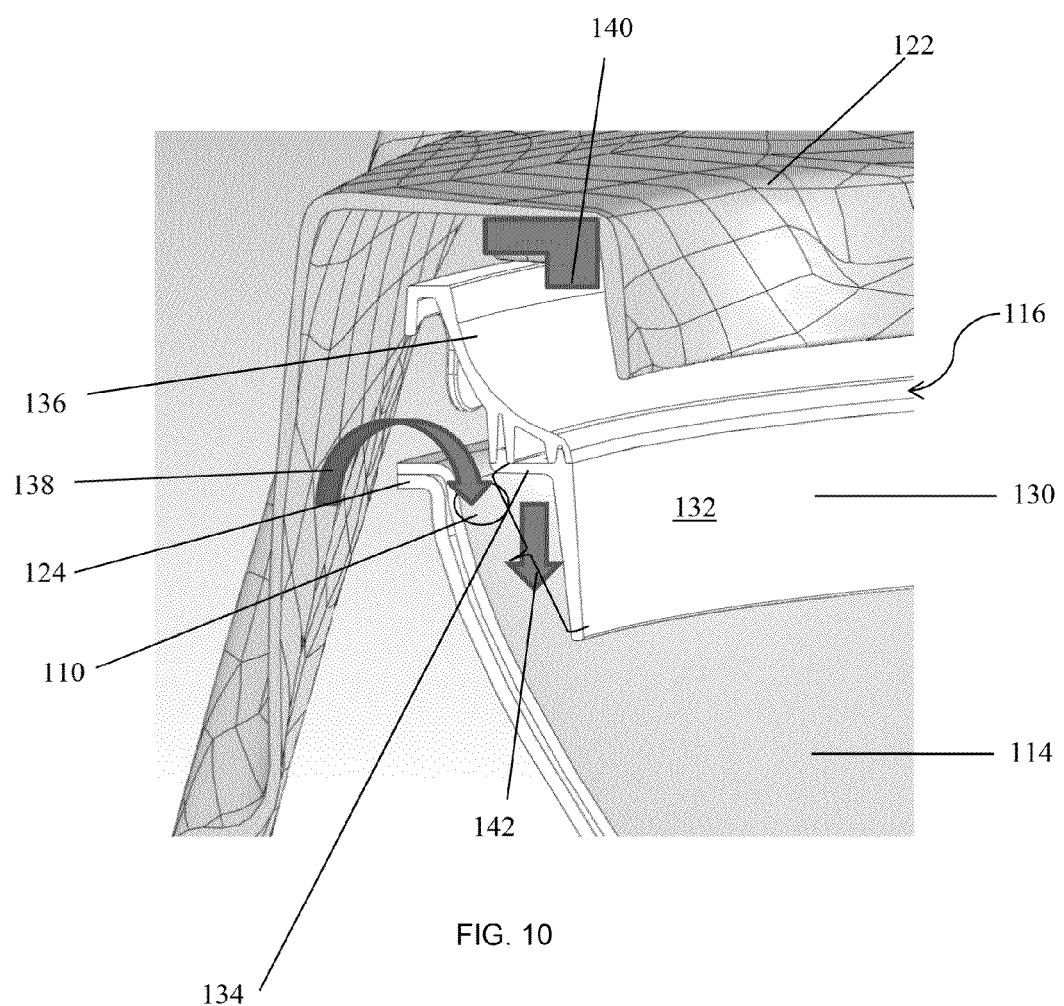
FIG. 10 shows a side sectional view of one embodiment of an improved toilet to shroud interface.

FIG. 10 shows a close-up view of an improved air diverter element 116 positioned with respect to the toilet bowl 114 and the shroud 122. Air diverter element 116 has a skirt 130 that extends down over the rinse ring 110. The skirt 130 provides a tortuous path for any waste that may attempt to migrate out of the toilet bowl 114 and onto the shroud 122. For example, in the embodiment shown, the skirt 130 has a lower flap 132, a rim-like portion 134, and an upwardly curved face 136. Upwardly curved face 136 interfaces with the shroud 122 and is secured in place to the shroud 122 via a seal 140. (This allows elimination of the safety blocks 120 shown by the prior art image of FIG. 7 and prevents any waste splash from extending up the curved face 136 and/or from migrating behind the curved face 136.)

Additionally, air and water delivered through the rinse ring 110 can help clean any areas on the skirt 130 where any waste splash back may occur. For example, if waste splash migrates onto the toilet-bowl facing surface 142 of the skirt 130 (e.g., onto the back of the flap 132 and/or the rim-like portion 134), the air and water delivered through the rinse ring 110 can rinse away the waste splash on the next flush cycle, at the same time that air and water are delivered for the flush sequence. Additionally, air is still introduced through a gap 138 between the air diverter element 116 and the toilet bowl rim 124 to address safety issues. This air gap 138 is protected by the skirt 130 from waste splash. The tortuous path created by the skirt 130 thus prevents waste from splashing up through gap 138 and under the shroud 122.

Figures 11A, 11B:
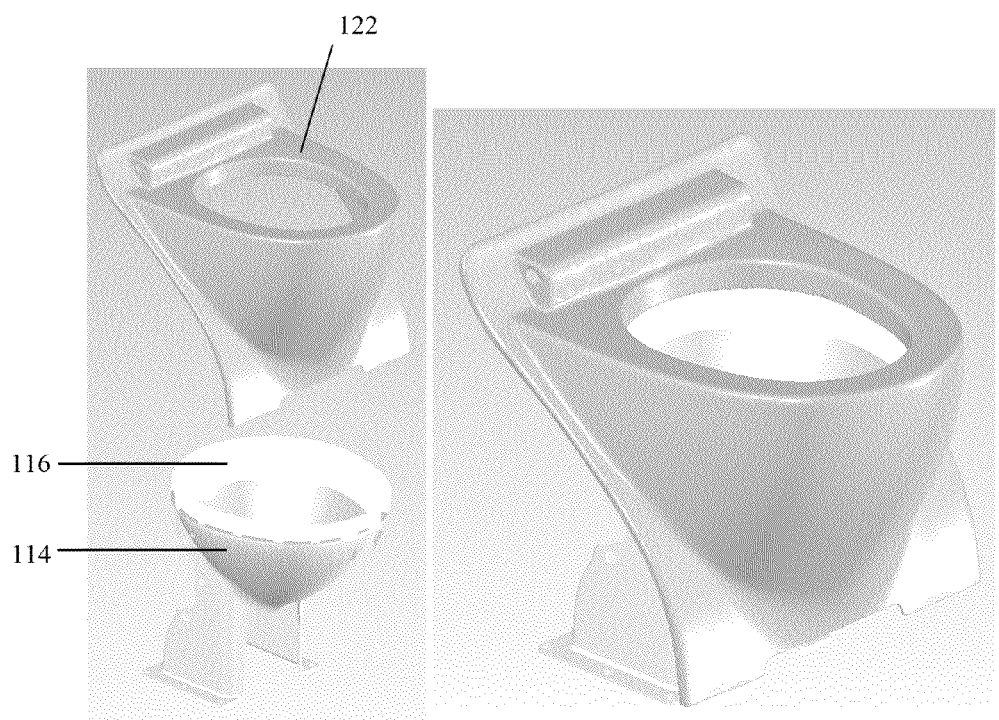
FIGS. 11A and 11B show perspective views of a toilet shroud being positioned over a toilet body.

FIG. 11A shows a shroud 122 being positioned over a toilet 114 with an air diverter element 116 in place on the toilet 108. FIG. 11B shows a completed assembly, with the shroud 122 secured into place, providing a seat area for the toilet bowl.

A further feature provided is a toilet bowl made of a composite material with a hardened surface. In this embodiment, a composite material is used rather than the typical stainless steel or other metal bowls. The toilet bowl may be a carbon fiber reinforced plastic (CFRP). This material is believed to provide about a 30% weight reduction from conventional stainless steel bowl constructions. A hardened fluoropolymer-infused metallic surface on the composite bowl may provide lubricity necessary for bowl cleaning after each flush. It may also provide a longer lasting surface than a traditional Teflon coating. This surface may be a fluoropolymer infused metal or metal alloy. The fluoropolymer may be any polymer that lends itself to providing lubricity for easier cleaning and to prevent residue from adhering to the bowl surface.

In one embodiment, the bowl may include a surface of Teflon impregnated nickel or chrome that is plated onto a CFRP bowl. Other embodiments include but are not limited to a fluoropolymer infused with nickel, titanium nitride, stainless steel, titanium, chromium, or any other appropriate metal, or any combination thereof A further embodiment provides an improvement to the vacuum flushing process. Septic waste holding tanks are typically fluidly connected to vacuum toilets system via a series of conduits, valves, and vacuum pumps in order to flush and route septic waste to the holding tanks The vacuum created for the flushing action may either be via one or more vacuum pumps, or, in the case of an aircraft in flight, via a pressure differential. The suction is generated either by the pressure differential between the pressurized cabin and the reduced pressure outside of an aircraft at high flight altitudes or by a vacuum generator at ground level or at low flight altitudes. Although efficient, vacuum toilets create a loud noise level during the flush cycle, due to the amount of vacuum that needs to be applied in order to cause the septic waste to travel from the toilet basin to the holding tank.

Accordingly, the present assignee has sought to reduce the noise associated with vacuum flushing by providing a two stage flush system, described in U.S. Ser. No. 13/804,539, titled "Two Stage Flush and Grey Water Flush Systems and Devices," incorporated herein by reference. The present inventors have sought various ways to improve the features of the two stage flush system and its related components.

Figure 12:
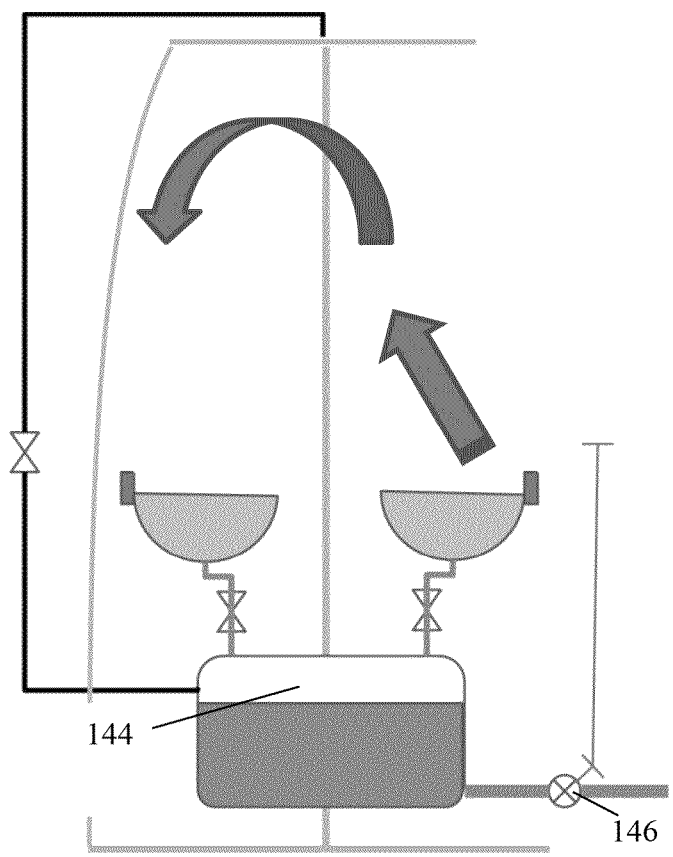
FIG. 12 shows a schematic view of an improved flushing configuration with a joint transient tank between lavatories.

As shown in FIG. 12, there is provided a two-stage flush that uses a single transient tank 144 positioned between nearby lavatories. This allows the two lavatories to be serviced by the single transient tank 144. The single transient tank 144 may be positioned in fluid communication between one or more toilet bowls and the main aircraft waste tank. This tank 144 holds waste from one or more a first stage flushes until the tank 144 becomes so full as to require emptying. This first stage flush reduces the noise level associated with the flush process because a lesser vacuum is demanded for the first stage of the flush, in order to deliver the waste to tank 144. Once emptying of the tank 144 is necessary, a second stage flush applies vacuum through a transfer valve 146 that delivers the waste to the on-board waste tank.

Any of the embodiments described above may be used separately or in combination with one another.

Changes and modifications, additions and deletions may be made to the structures and methods recited above and shown in the drawings without departing from the scope or spirit of the invention and the following claims.

What is claimed is:

1. A quick release toilet system for securing and releasing a toilet to and from a stationary structural interface, comprising
   (a) a toilet body having a toilet body base;
   (b) a first clamp feature for securing the toilet body base to the structural interface, the first clamp feature comprising first and second arms joined at first ends by a hinge and joined at second ends by a locking feature, wherein one of the first clamp feature arms comprises a vacuum interface structure;
   (c) the toilet body further comprising a vacuum interface clamp feature; wherein the vacuum interface clamp feature secures the toilet body to the vacuum interface structure of the first clamp, wherein vacuum interface clamp comprises first and second arms joined at first ends by a hinge and joined at second ends by a locking feature, wherein one of the vacuum interface clamp arms is secured to the toilet body,
   wherein in use, the first and second arms of the first clamp feature secure the toilet body base to the structural interface, and the first and second arms of the vacuum interface clamp are secured around the vacuum interface structure of the first clamp.

2. The quick release toilet system of claim 1, where in the structural interface comprises a first end secured to the aircraft lavatory floor via a mounting plate and a second end comprising a clamp cooperating surface.

3. The quick release toilet system of claim 1, wherein when the toilet body is positioned on the structural interface, the vacuum interface clamp feature is secured to the vacuum interface and the first clamp feature is secured around the toilet body base.

* * * * *